US010247311B2

(12) United States Patent
Frederick

(10) Patent No.: US 10,247,311 B2
(45) Date of Patent: Apr. 2, 2019

(54) VARIABLE HEIGHT BACKUP ASSEMBLY FOR ARTICULATING BOOTS

(71) Applicant: Parker-Hannifin Corporation, Cleveland, OH (US)

(72) Inventor: William Brooks Frederick, Winona Lake, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 253 days.

(21) Appl. No.: 15/152,846

(22) Filed: May 12, 2016

(65) Prior Publication Data

US 2016/0356115 A1 Dec. 8, 2016

Related U.S. Application Data

(60) Provisional application No. 62/170,470, filed on Jun. 3, 2015.

(51) Int. Cl.

| | |
|---|---|
| ***F16J 15/16*** | (2006.01) |
| ***F16J 15/52*** | (2006.01) |
| ***E21B 17/04*** | (2006.01) |
| ***F16J 15/12*** | (2006.01) |
| *E21B 33/00* | (2006.01) |

(52) U.S. Cl.

CPC ............... *F16J 15/52* (2013.01); *E21B 17/04* (2013.01); *F16J 15/121* (2013.01); *E21B 2033/005* (2013.01)

(58) Field of Classification Search

CPC .... E21B 17/02; E21B 17/04; E21B 2033/005; F16J 15/52; F16J 15/121

See application file for complete search history.

(56) References Cited

U.S. PATENT DOCUMENTS

| | | | | |
|---|---|---|---|---|
| 2,013,267 A * | 9/1935 | Damsel | F16L 17/04 277/616 |
| 3,784,214 A * | 1/1974 | Tamplen | E21B 33/1208 277/341 |
| 4,190,258 A | 2/1980 | Arai et al. | |
| 4,428,590 A * | 1/1984 | Pippert | F16J 15/166 277/638 |

(Continued)

FOREIGN PATENT DOCUMENTS

CA 2199320 1/2005

*Primary Examiner* — Gilbert Y Lee

(74) *Attorney, Agent, or Firm* — Renner, Otto, Boisselle & Skalr, LLP

(57) ABSTRACT

A backup assembly is provided for backing up a seal assembly that seals a gap between two components of a joint assembly. The backup assembly may include an elastomer, a spring element embedded within the elastomer, and first and second rings located adjacent to the elastomer on opposite sides of the spring element. The spring element may be a garter spring, and the elastomer may be over-molded around the spring. The elastomer may have opposing wing extensions that extend respectively along the first and second rings, and the rings may be steel rings. The elastomer, spring element, and rings form an annular backup ring. The backup assembly may be employed in a seal assembly for sealing a gap between two components of a joint assembly. The seal assembly may include a diaphragm seal component, and the backup assembly operates to provide backup and extrusion resistance for the seal component.

9 Claims, 6 Drawing Sheets

(56) References Cited

U.S. PATENT DOCUMENTS

| | | | | |
|---|---|---|---|---|
| 4,755,244 | A | 7/1988 | Allison | |
| 5,040,905 | A | 8/1991 | Boyd | |
| 5,161,806 | A * | 11/1992 | Balsells | F16J 15/027 267/1.5 |
| 5,350,017 | A * | 9/1994 | Henderson, Jr. | E21B 33/035 166/208 |
| 5,799,953 | A | 9/1998 | Henderson | |
| 8,444,185 | B2 * | 5/2013 | Peddle | E21B 17/04 277/341 |
| 2006/0214380 | A1 | 9/2006 | Dietle et al. | |

* cited by examiner

FIG. 5
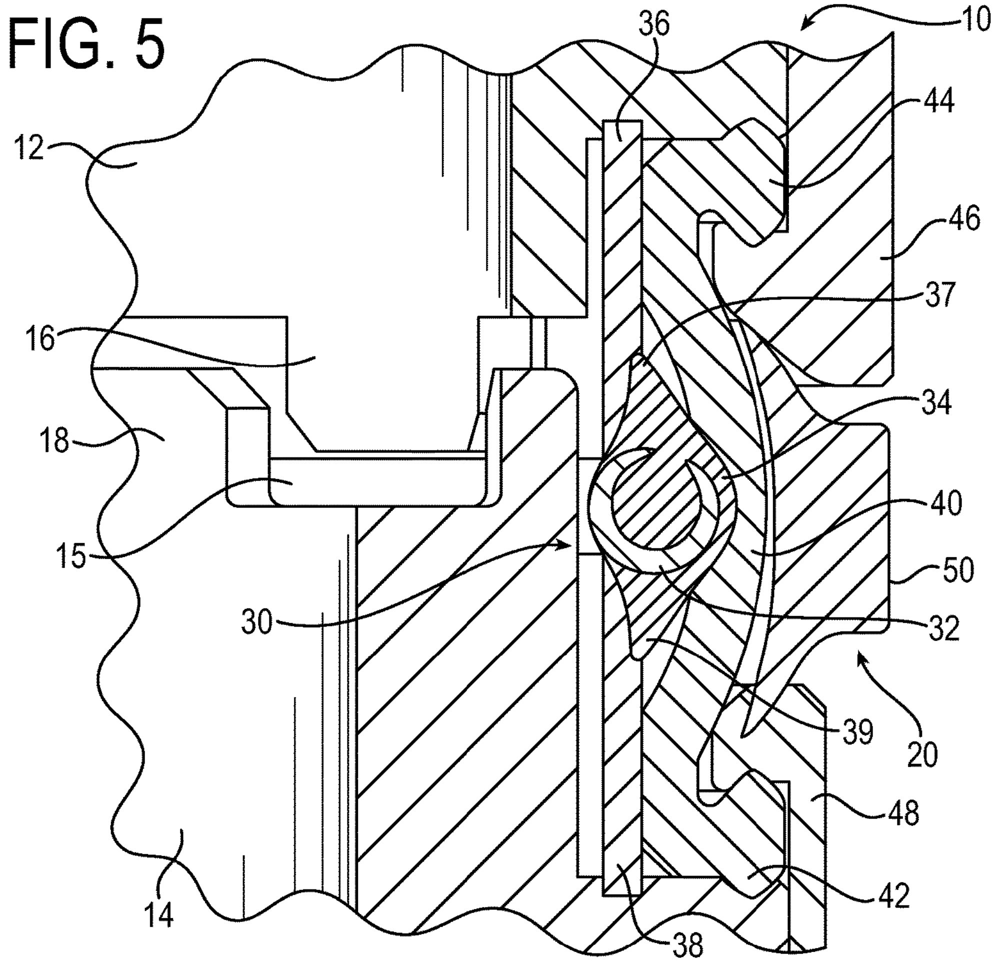
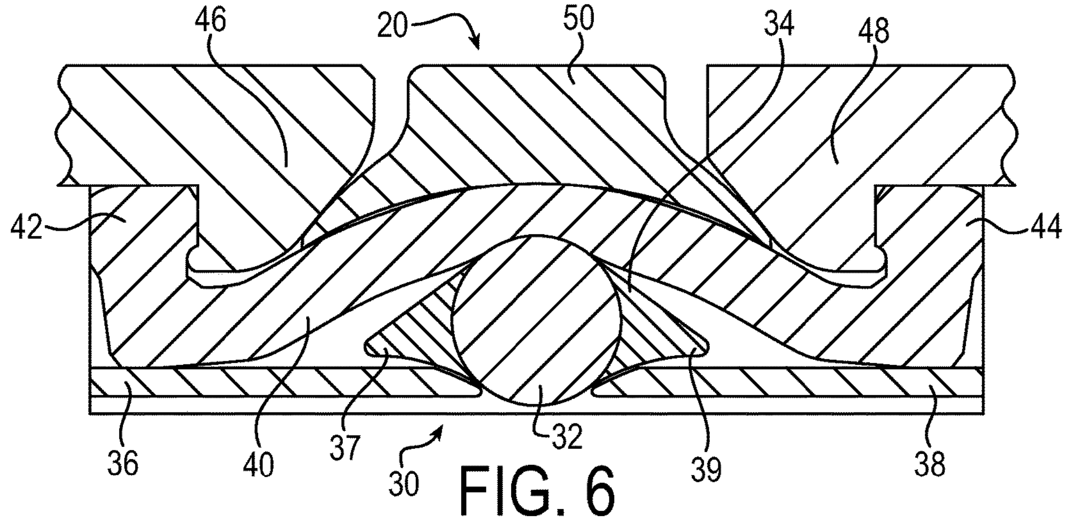
FIG. 6

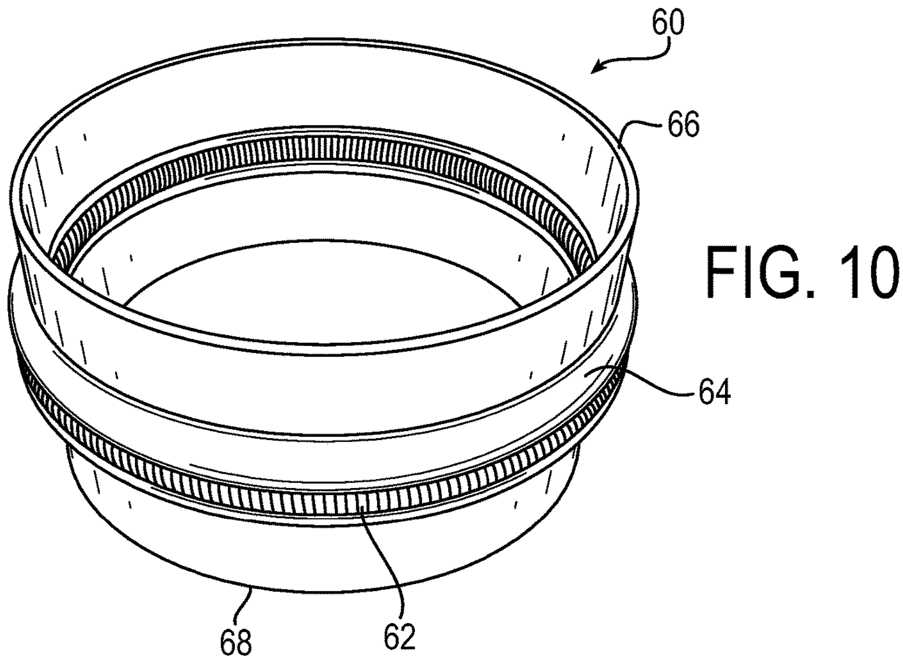
FIG. 10
FIG. 11
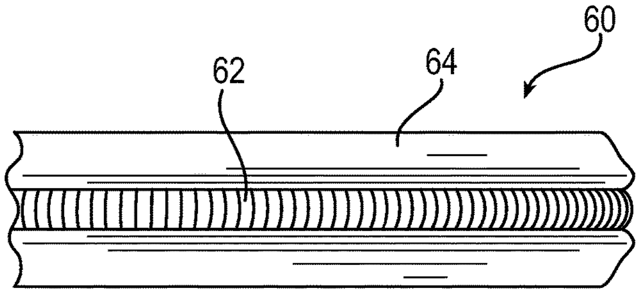
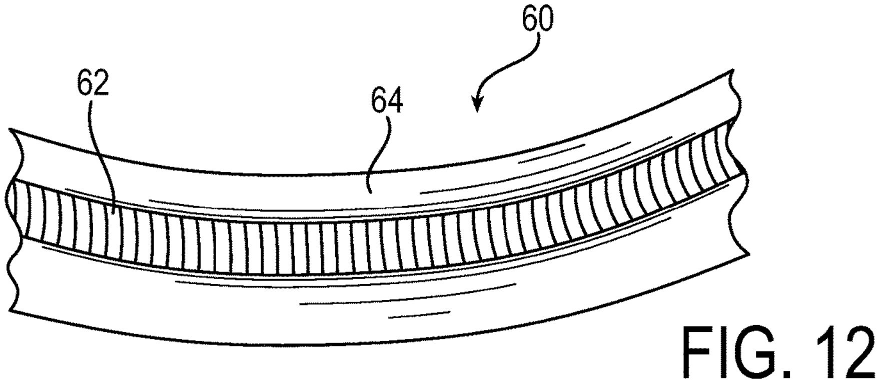
FIG. 12

VARIABLE HEIGHT BACKUP ASSEMBLY FOR ARTICULATING BOOTS

RELATED APPLICATIONS

This application claims priority to U.S. Provisional Patent Application No. 62/170,470 filed on Jun. 3, 2015, the entire disclosure of which is hereby incorporated by reference.

FIELD OF INVENTION

The present invention relates to seals that are suitable for sealing joints between relatively movable mechanical components, and more particularly to seals for use in high pressure applications such as down-hole oil and gas drilling.

BACKGROUND OF THE INVENTION

Sealing large gaps under high pressure is often needed in various applications. Many of these applications are dynamic, where the seal must compensate for an offset and/or flexing of the mating components, also referred to as articulation. One such application is for tools employed in directional/horizontal down-hole oil, gas and geothermal drilling. Steerable down-hole drills use castellated sections to transfer rotational motion while maintaining flexibility of the system. The joints between the castellated sections have extrusion gaps between the teeth of the castles, and large open areas adjacent the exterior walls allow the two sections to flex with respect to each other. To seal across the two sections, a diaphragm is typically used to keep high pressure (e.g. at about 1500 psi) oil in and high pressure (e.g., about 5000 psi) mud out. The seal typically must be able to withstand temperatures up to about 200-400° F. depending on the application. Extrusion of the diaphragm between the teeth is a primary cause of sealing failure.

SUMMARY OF THE INVENTION

Aspects of the present invention provide an extrusion resistant backup assembly for a radial seal/boot/diaphragm. Such sealing structures are used in applications having high pressure joints where a radial seal/boot/diaphragm is needed, and needs to be flexible so as to compensate for articulation of the mating structures. The extrusion resistant backup assembly is particularly suitable for backing up a sealing element in an oil and gas downhole steerable drill, although the present invention may be employed in other applications in which an extrusion resistant backup for a radial sealing element or similar component is desirable.

In exemplary embodiments, an extrusion resistant backup assembly may include a plurality of metal rings, and in a preferred embodiment two metal rings, and an elastomeric ring with a garter spring insert. The backup assembly may be assembled on an inner diameter of a diaphragm boot, and allows for a variable gap corresponding to the height of the diaphragm when assembled. The backup assembly also allows for articulation of the joint during tool operation when assembled. The backup assembly allows articulation of the joint while also being designed for a variable mating gap, which is not achievable in conventional configurations, and which permits the present invention to withstand higher pressures as compared to conventional configurations. The backup assembly further may include wings on an over-molded spring to reduce strain in the diaphragm boot.

An aspect of the invention is a backup assembly for backing up a seal assembly that seals a gap between two components of a joint assembly. In exemplary embodiments, the backup assembly may include an elastomer, a spring element embedded within the elastomer, and first and second rings that are located adjacent to the elastomer on opposite sides of the spring element. The spring element may be a garter spring, and the elastomer may be over-molded around the spring element. The elastomer may have a plurality of opposing wing extensions that extend respectively along the first and second rings, and the first and second rings may be steel rings. The elastomer, spring element, and rings may be annular components that form an annular backup ring. The first and second rings may be bonded to the elastomer.

The backup assembly may be employed in a seal assembly for sealing a gap between two components of a joint assembly. In exemplary embodiments, the seal assembly may include a diaphragm seal component and the backup assembly configured as in any of its embodiments. The backup assembly supports the diaphragm seal assembly against pressures applied to the diaphragm seal component. The seal assembly further may include a filler located on a side of the diaphragm seal component opposite from the backup assembly to provide additional backup support.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 5 is a drawing depicting a cross-sectional view of the exemplary backup assembly in use as in FIG. 4.

FIG. 6 is a drawing depicting a cross-sectional view of an exemplary diaphragm seal assembly with backup assembly in accordance with embodiments of the present invention.

FIG. 10 is a drawing depicting another configuration of an exemplary backup assembly in accordance with embodiments of the present invention.

FIG. 11 is a drawing depicting a close-up view of a portion of the exemplary backup assembly of FIG. 10.

FIG. 12 is a drawing depicting a close-up view of another portion of the exemplary backup assembly of FIGS. 10 and 11.

DETAILED DESCRIPTION

Figure 1:
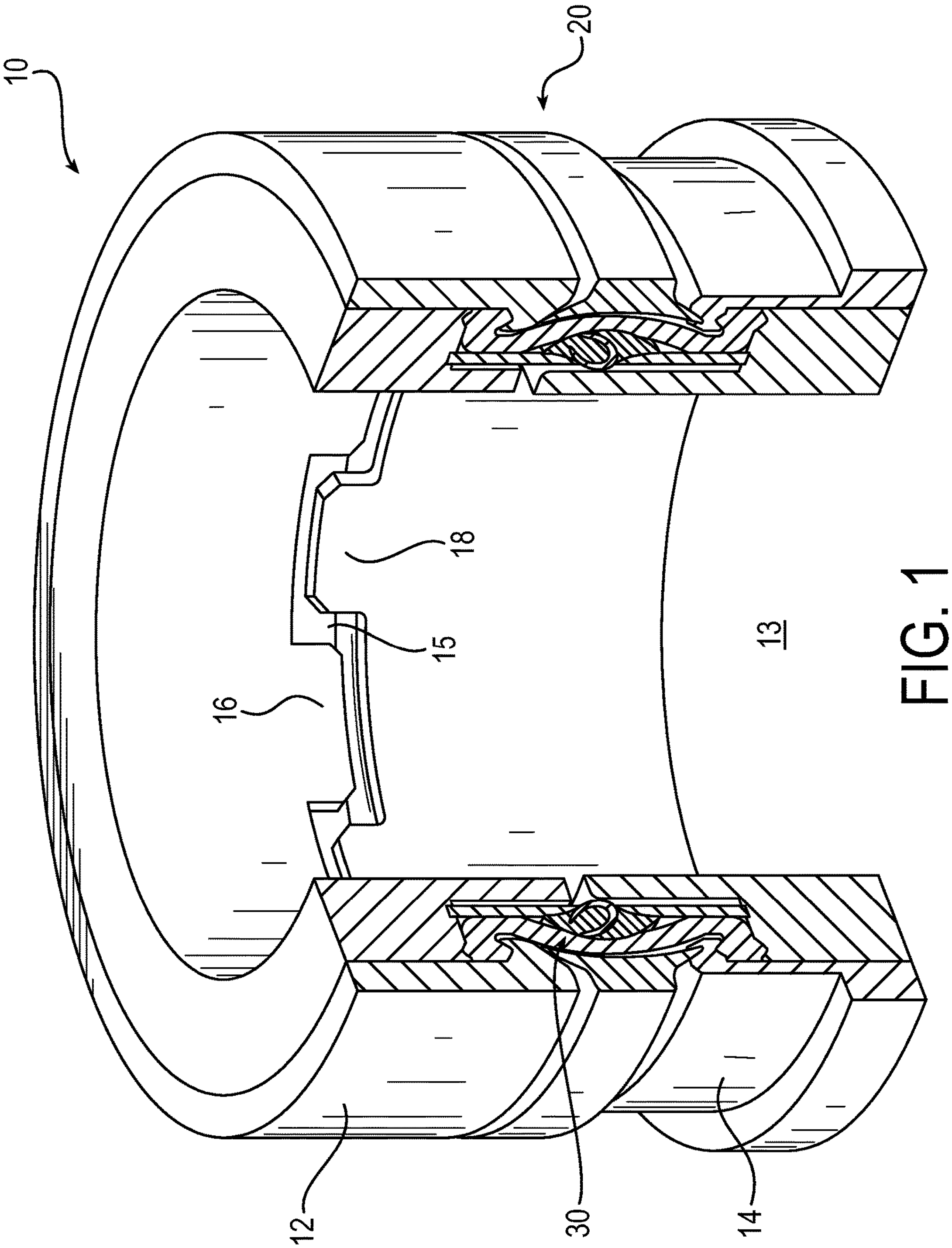
FIG. 1 is a drawing depicting a perspective view, partially broken away, of a joint of two drill string segments including an exemplary diaphragm seal assembly with a backup assembly in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting a perspective view, partially broken away, of a castle joint section 10 of two drill string segments 12 and 14. The drilling segments 12 and 14 may have castellated end sections that are joined together by meshing the teeth of one end section with the teeth of the adjoining end section. The drilling segments define a central passage 13 for the passage of fluid. The thusly mated end sections form the joint between two castellated sections. Teeth 16 of the first segment 12 can engage teeth 18 of the second segment 14 so that the rotary motion can be transferred through the joint, while gaps 15 between the teeth give the teeth some degree of freedom to move (i.e., articulation) with respect to each other as the drill segments are rotated and driven downward.

An annular diaphragm seal assembly 20 bridges the gaps 15 between the teeth 16 and 18 of the two drilling segments, and thus seals the gap between the two segments. The diaphragm seal assembly prevents escape of fluid from the central passage 13 defined by the drilling segments and prevents entry of mud (or other environmental contaminant matter) into the central passage 13 under extreme pressures. To enhance efficacy of the sealing performance, particularly as against the extreme external pressures pushing inward toward the central passage 13, the diaphragm seal assembly may include a backup assembly 30.

An aspect of the invention, therefore, is a backup assembly for backing up a seal assembly that seals a gap between two components of a joint assembly, such as a castellated joint assembly with articulating boots as shown in FIG. 1. In exemplary embodiments, the backup assembly may include an elastomer, a spring element embedded within the elastomer, and first and second rings that are located adjacent to the elastomer on opposite sides of the spring element. The first and second rings may be bonded to the elastomer. The spring element may be a garter spring, and the elastomer may be over-molded around the spring element. The elastomer may have a plurality of opposing wing extensions that extend respectively along the first and second rings, and the first and second rings may be steel rings. The elastomer, spring element, and rings may be annular components that form an annular backup ring. The backup assembly may be employed in a seal assembly for sealing a gap between two components of a joint assembly.

Figure 2:
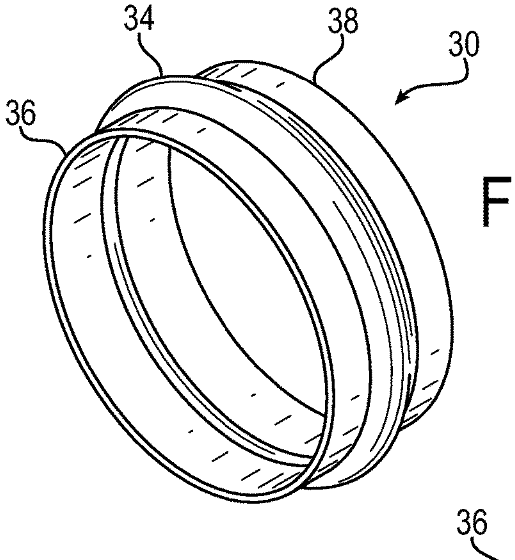
FIG. 2 is a drawing depicting an isometric view of an exemplary backup assembly in accordance with embodiments of the present invention.
Figure 3:
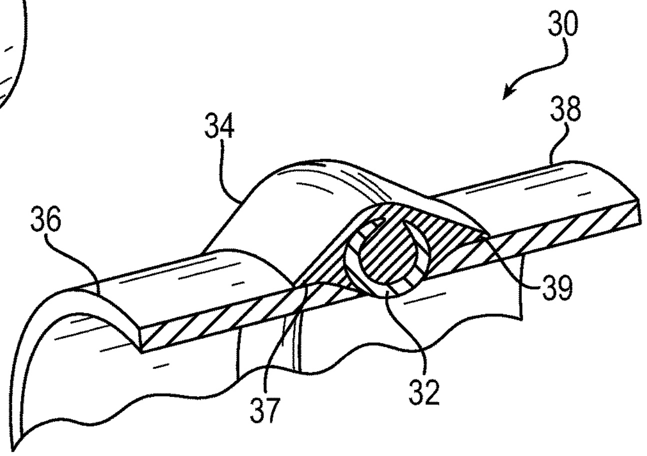
FIG. 3 is a drawing depicting an isometric view of a portion of the exemplary backup assembly of FIG. 2 in cross-section.

FIG. 2 is a drawing depicting an isometric view of an exemplary backup assembly 30 in accordance with embodiments of the present invention. FIG. 3 is a drawing depicting an isometric view of a portion of the exemplary backup assembly 30 of FIG. 2 in cross-section. As seen in FIGS. 2 and 3, the backup assembly 30 may include an inner spring element 32 embedded within an elastomer 34. The spring element 32 may be configured as a garter spring. The elastomer 34 with the garter spring 32 may be located adjacent to first and second rings 36 and 38, with each of the first and second rings being positioned on opposite sides of the spring element (garter spring) 32. In exemplary embodiments, the first and second rings 36 and 38 may be bonded to the elastomer, and may be steel rings, or made of another suitable metal or like rigid material. The elastomer may made of any suitable rubber-like or elastomeric material as are known in the art for use with high pressure seals. The elastomer 34 may be over-molded around the garter spring and onto the steel rings. The elastomer may have a plurality of wing extensions 37 and 39 that extend respectively along the first and second rings. The wing extensions may enhance the performance of the backup assembly as further described below. The elastomer, spring element, and rings may be annular components that form an annular backup ring, as seen for example in the complete ring structure of FIG. 2.

Figure 4:
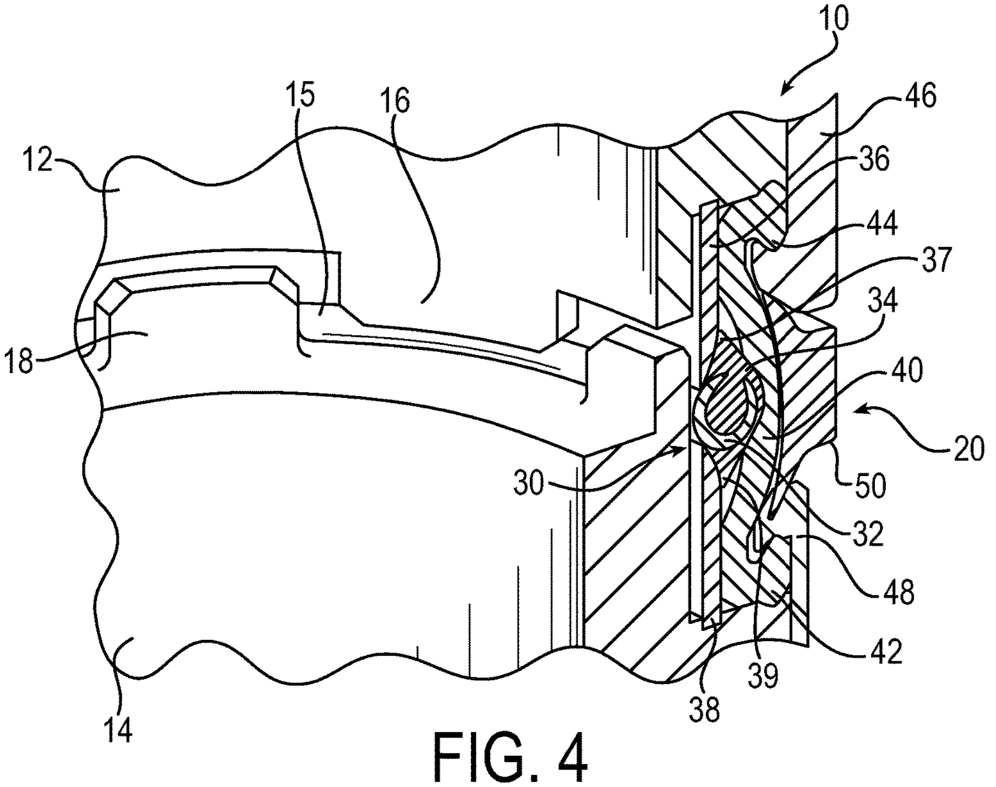
FIG. 4 is a drawing depicting an isometric view of the exemplary backup assembly in use with a diaphragm seal assembly to seal a castellated joint, in accordance embodiments of the present invention.

FIG. 4 is a drawing depicting an isometric view of the exemplary backup assembly 30 in use with a diaphragm seal assembly 20 to seal a castellated joint with articulating boots, in accordance embodiments of the present invention. FIG. 5 is a drawing depicting a cross-sectional view of the exemplary backup assembly in use as in FIG. 4. FIG. 6 is a drawing depicting a cross-sectional view of the exemplary diaphragm seal assembly 20 with backup assembly 30 in accordance with embodiments of the present invention, in a more generalized schematic format. Like reference numerals are used in FIG. 6 for the backup assembly components as in the previous figures. In particular, FIGS. 4 and 5 depict an exemplary configuration of how the backup assembly 30 may be employed in use as part of the diaphragm seal assembly 20 in the castle joint section 10 formed by drilling segments 12 and 14. FIG. 6 provides a more generalized representation with focus on the overall components of the diaphragm seal assembly 20 with backup assembly 30.

As referenced above, referring first to FIGS. 4 and 5, the drilling segments 12 and 14 may have castellated end sections or boots that are joined together by meshing the teeth of one end section with the teeth of the adjoining end section. The thusly mated end sections form the joint between two castellated sections, and articulation may occur as between the castellated sections. As seen in FIGS. 4 and 5, teeth 16 of the first segment 12 can engage teeth 18 of the second segment 14 so that the rotary motion can be transferred through the joint, while gaps 15 between the teeth give the teeth some degree of freedom to move with respect to each other as the drill segments are rotated and driven downward. The annular diaphragm seal assembly 20 bridges the gaps 15 between the teeth 16 and 18 of the two drilling segments, and thus seals the gap between the two segments. The backup assembly operates to enhance efficacy of the sealing performance, and in this regard acts as an extrusion resistant backup of the seal component of the diaphragm seal assembly 20 especially as against external pressures driving from the outside toward the central passage, which may run as high as approximately 5000 psi.

As seen in FIGS. 4-6, in addition to the backup assembly 30 and its associated components (garter spring element 32, over-molded elastomer 34, and steel rings 36 and 38), the diaphragm seal assembly further may include a diaphragm seal component 40 that extends over the backup assembly 30. The backup assembly supports the diaphragm seal assembly against pressures applied to the diaphragm seal component 40. The diaphragm seal component 40 may end in two protrusion beads 42 and 44. To maintain the seal in place, clamps 46 and 48, which are respectively bolted to the drill segments 12 and 14, maintain the diaphragm seal component 40 in place. The diaphragm seal assembly 20 further may include an outer filler 50 that provides a backup function to the diaphragm particularly as against internal pressures from the central passage outward.

Figure 7:
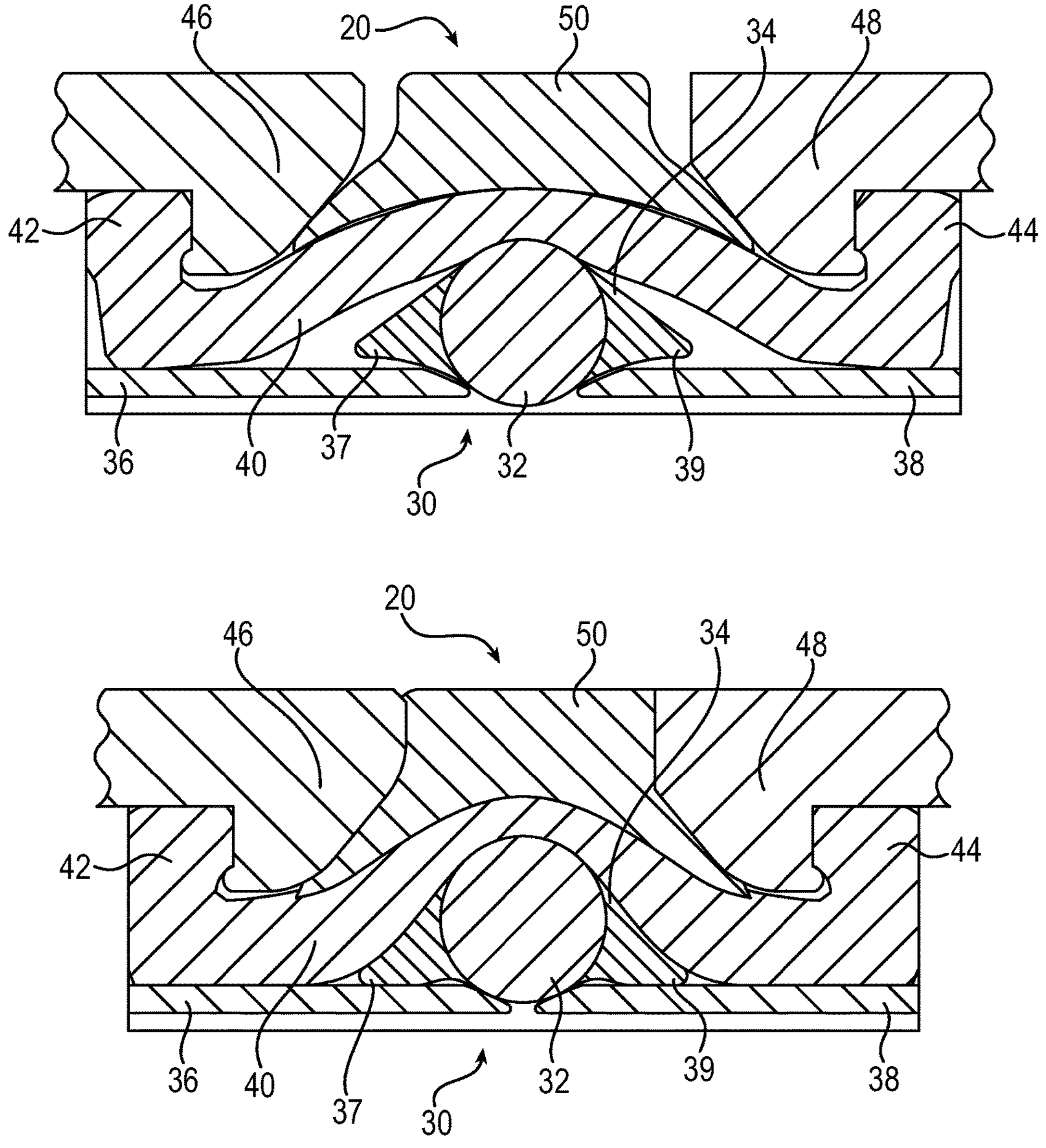
FIG. 7 is a drawing depicting a cross-sectional view of the exemplary seal assembly with backup assembly of FIG. 6, in a functional use state so as to accommodate different sized castle gaps.
Figure 8:
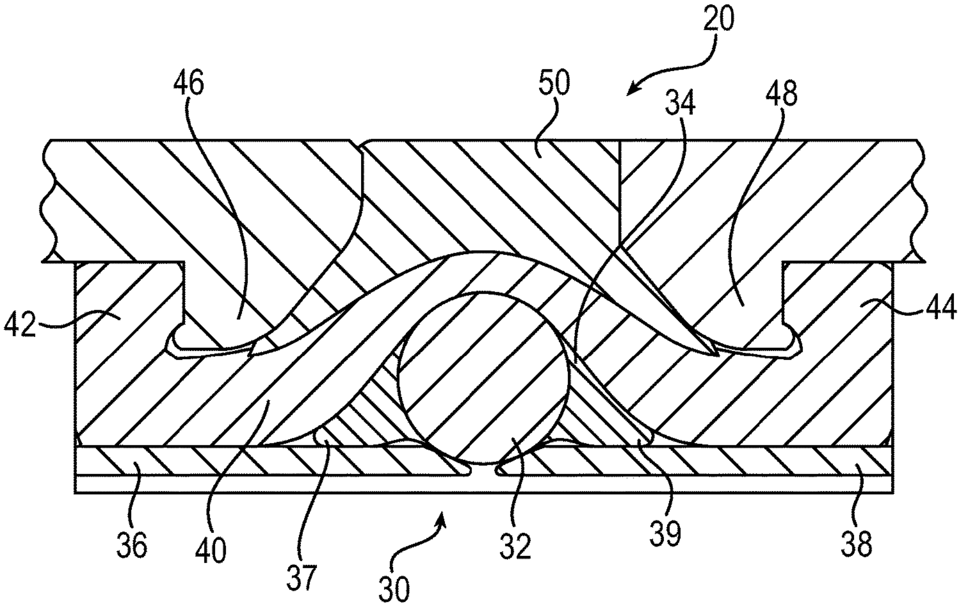
FIG. 8 is a drawing depicting a cross-sectional view of the exemplary seal assembly with backup assembly of FIG. 6, in a functional use state so as to enhance the efficacy of the seal by providing external pressure resistance.
Figure 9:
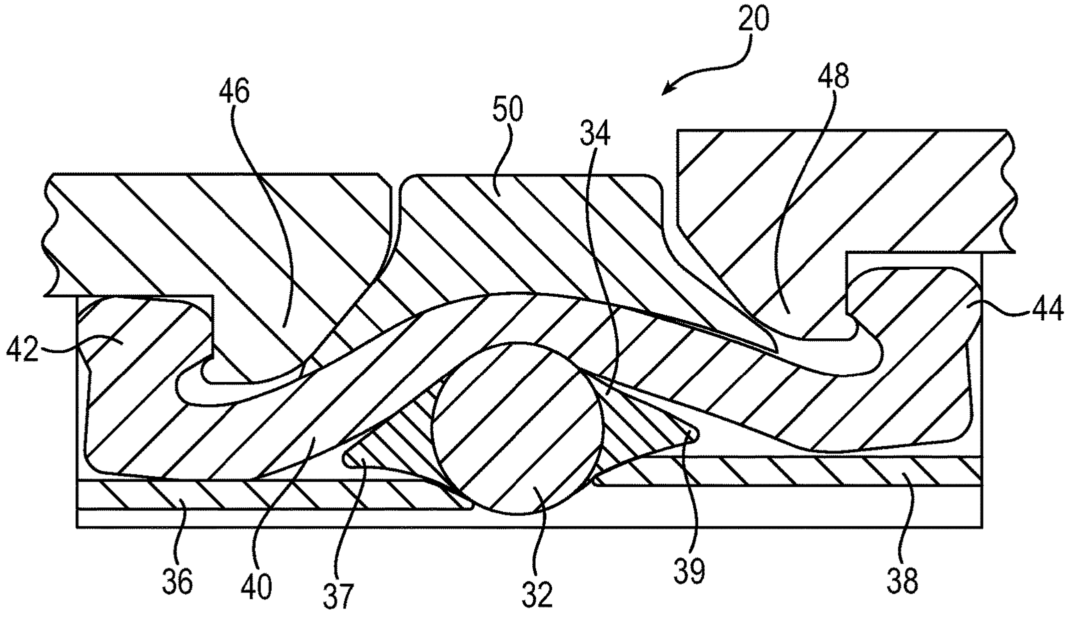
FIG. 9 is a drawing depicting a cross-sectional view of the exemplary seal assembly with backup assembly of FIG. 6, in a functional use state so as to maintain the backup function under the occurrence of articulation of drill segments.

FIGS. 7-9 are drawings depicting a cross-sectional view of the exemplary diaphragm seal assembly 20 with backup assembly 30 of FIG. 6 in various functional use states. Accordingly, like reference numerals are used in FIGS. 7-9 as in FIG. 6. FIG. 7 shows how the backup assembly 30 is variable so as to accommodate different sized castle gaps. The top portion of FIG. 7 represents a larger castle gap configuration, and the bottom portion of FIG. 7 represents a smaller castle gap configuration. The garter spring 32 with the elastomer 34 permits the steels rings 36 and 38 to spread farther apart from each other to accommodate a larger gap (top portion), as compared to a smaller gap (bottom portion) in which the steel rings 36 and 38 may be closer together by compression of the garter spring and elastomer. The wing extensions 37 and 39 also may compress and expand based on the breadth of the castle gap. By the ability of the backup assembly components to compress and expand, an effective backup function is performed even with variation of the castle gap.

FIG. 8 shows how the backup assembly 30 enhances the efficacy of the seal by providing external pressure resistance under the extreme external pressures referenced above. The garter spring 32 and the steel rings 36 and 38 prevent extrusion of the diaphragm material 40 with the articulation that may occur under the high external pressures. In addition, the wing extensions 37 and 39 operate to reduce high strain on the diaphragm material 40 in the area adjacently around the garter spring 32. The diaphragm seal assembly 20 further may include the outer filler 50 that provides a backup function to the diaphragm particularly as against internal pressures from the central passage outward.

FIG. 9 shows how the backup assembly 30 further is a variable backup component by maintaining the backup function under the occurrence of articulation of the drill segments. Although FIG. 9 shows an exemplary articulation in a lateral direction, articulation also may occur in a longitudinal direction along the joint. In the event of any such articulations, the positioning of the steel rings 36 and 38 and the wing extensions 37 and 39 may adjust position relative to the garter spring so as to maintain the backup function regardless of the direction of the articulation.

FIGS. 10-12 are drawings depicting another configuration of an exemplary backup assembly 60 in accordance with embodiments of the present invention, with FIGS. 11 and 12 depicting close-up views of portions of the overall backup assembly 60 shown in FIG. 10. Similarly to the backup assembly 30, the backup assembly 60 may include an inner garter spring 62 embedded within an elastomer 64. The elastomer 64 with the garter spring 62 may be bonded to first and second steel rings 66 and 68. The elastomer 64 may be over-molded onto the garter spring and steel rings. In the embodiment of FIGS. 10-12, the garter spring 62 may be at least partially exposed from the elastomer, rather than fully over-molding the elastomer material over the garter spring as in the previous embodiment.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A seal assembly for sealing a gap between two components of a joint assembly, the seal assembly comprising:
- a diaphragm seal component; and
- a backup assembly comprising an elastomer, a spring element embedded within the elastomer, and first and second rings that are located adjacent to the elastomer on opposite sides of the spring element;
- wherein the backup assembly supports the diagraph seal assembly against pressures applied to the diaphragm seal component; and
- wherein the elastomer with the embedded spring is positioned to extend into a gap between the first and second rings such that the spring element and elastomer expand and compress to accommodate different spacings at the gap between the first and second rings.

2. The seal assembly of claim 1, wherein the spring element is a garter spring.

3. The seal assembly of claim 1, wherein the elastomer is over-molded around the spring element.

4. The seal assembly of claim 1, wherein the elastomer has a plurality of opposing wing extensions that extend respectively along the first and second rings, and the wing extensions reduce strain in the diaphragm seal component adjacent to the spring element.

5. The seal assembly of claim 1, wherein the first and second rings are steel rings.

6. The seal assembly of claim 1, wherein the elastomer, spring element, and rings are annular components that form an annular backup ring; and
- the diaphragm seal component is an annular diaphragm and is supported by the backup ring.

7. The seal assembly of claim 1, wherein the spring element is at least partially exposed from the elastomer.

8. The seal assembly of claim 1, further comprising a filler located on a side of the diaphragm seal component opposite from the backup assembly.

9. The seal assembly of claim 1, wherein the first and second rings are bonded to the elastomer.

* * * * *